United States Patent [19]
Vaughan et al.

[11] Patent Number: 5,637,287
[45] Date of Patent: Jun. 10, 1997

[54] SYNTHESIS PROCESS FOR FAUJASITE FAMILY ZEOLITES USING MOTHER LIQUOR RECYCLE

[75] Inventors: David E. W. Vaughan, Flemington; Karl G. Strohmaier, Port Murray, both of N.J.

[73] Assignee: Exxon Research & Engineering Company, Florham Park, N.J.

[21] Appl. No.: 595,680

[22] Filed: Feb. 2, 1996

[51] Int. Cl.$^6$ ................................ C01B 39/20
[52] U.S. Cl. .................. 423/702; 423/704; 423/705; 423/709; 423/713; 423/DIG. 21; 502/79
[58] Field of Search ................ 423/702, 704, 423/705, 709, 713, DIG. 21; 502/79

[56] References Cited

U.S. PATENT DOCUMENTS

| | | | |
|---|---|---|---|
| 3,459,501 | 8/1969 | Plank et al. | 423/DIG. 21 |
| 3,506,594 | 4/1970 | Haden et al. | 423/DIG. 21 |
| 4,160,011 | 7/1979 | Estes et al. | 423/DIG. 21 |
| 4,376,106 | 3/1983 | Miyanohara et al. | 423/DIG. 21 |
| 4,385,042 | 5/1983 | Whitehurst et al. | 423/709 |
| 4,587,115 | 5/1986 | Arika et al. | 423/DIG. 21 |
| 4,714,601 | 12/1987 | Vaughan | 423/DIG. 21 |
| 4,879,103 | 11/1989 | Vaughan | 423/DIG. 21 |
| 4,931,267 | 6/1990 | Vaughan et al. | 423/705 |
| 4,965,059 | 10/1990 | Vaughan et al. | 423/DIG. 21 |
| 5,116,590 | 5/1992 | Vaughan et al. | 423/DIG. 21 |

OTHER PUBLICATIONS

Felder et al. "*Elementary Principles Of Chemical Processes*" 1978 p. 106.

*Primary Examiner*—Karl Group
*Assistant Examiner*—David Sample
*Attorney, Agent, or Firm*—Ronald D. Hantman

[57] ABSTRACT

A process to make high silica faujasite family zeolites using preformed gels and templates derived from recycled mother liquors.

8 Claims, No Drawings

SYNTHESIS PROCESS FOR FAUJASITE FAMILY ZEOLITES USING MOTHER LIQUOR RECYCLE

FIELD OF THE INVENTION

The present invention relates to an improved process for the synthesis of a high silica zeolite having the faujasite family structures containing organic templates. The product may be employed in catalytic, absorbent or separation applications, particularly in cracking and hydrocracking catalysts.

BACKGROUND OF THE INVENTION

Large pore zeolites with high silica to alumina ratios, i.e., of at least four, are desirable because of their particular catalytic selectivity and their thermal stability; the latter is a property particularly important when the zeolite is used as catalyst or in adsorption procedures wherein exposure to high temperatures would be expected. Although faujasite zeolites having silica to alumina ratios of less than four can be readily synthesized by a variety of methods, as disclosed, e.g., in U.S. Pat. Nos. 2,882,244 and 4,178,352, methods for preparing faujasite polymorphs of higher ratios generally involve several weeks of crystallization and result in poor yields of product, as reported by Kacirek, *J. Phy. Chem.*, 79, 1589 (1975). The process of this invention is specifically directed to making products identified as comprising faujasite (FAU), "Breck-6" (BSS or EMT) and intergrowths of the two (i.e. the faujasite family of zeolites).

The use of quaternary ammonium salts as templates or reaction modifiers in the preparation of synthetic crystalline aluminosilicates (zeolites), first discovered by R. M. Barrer in 1961, has led to preparation of zeolites with high silica to alumina ratios which are not found in nature. A review provided by Barrer in *Zeolites*, Vol. I, p. 136 (October, 1981) shows the zeolite types which are obtained using various ammonium organic bases as cation. In addition, Breck, *Zeolite Molecular Sieves*, John Wiley (New York, 1974), pp. 348–378, provides a basic review of zeolites obtained using such ammonium cations in the synthesis thereof, as does a review by Lok et al. (Zeolites, 3, p. 282, 1983)). The faujasite family of materials is well reviewed by Treacy et al. (Proc. Royal Soc., A, 1996) and in U.S. Pat. No. 5,116,590, included herein by reference.

Alkylammonium templates are the high cost component of the synthesis and therefore may be a dominant component of the manufacturing economies. Many attempts to recycle the "template" containing mother liquor (ML) from succeeding zeolite preparations fail because in addition to the "template" the ML contains polymerized reactants and impurity nuclei. In the case of high silica faujasite type preparations (FAU/BSS) ZSM-5 and gismondine are the major problem impurities. Although such methods as "template" recrystallization, steam stripping of ML, ion-exchange and centrifugation may be used to recover "template", all require expensive equipment and are energy intensive. The subject processes do not require such expenditures.

We have discovered that by using controlled composition, controlled release, reagents, impurity growth can be controlled and the raw, filtered, ML can be used to make high purity high silica products. By using silica and alumina reagents in a combined form, (i.e. one example is silica-alumina gel, similar to the old FCC amorphous catalyst) we can use recycled template liquors in the synthesis, whereas recycle ML cannot be used in a repeat of the standard synthesis using conventional dissolved silicates and aluminates. The use of such combined silica-alumina raw material also provides a new method for making the base case ECR-32, allowing a continuous process of synthesis using one raw material and continuous recycle of all waste liquids. Using such methods the process economics are improved in a major way in an more environmentally friendly process, further reducing effluent waste treatment costs. It is recognized that other "T-atom" forms (e.g. Ca, Zn, Fe, B, Ti, V alone or in combination with Al) may be made by appropriate substitutions in the gel.

Appropriate templates for making the subject materials include tetra-alkyl ammonium ions having methyl, ethyl, propyl or butyl substituents or their hydroxyl substituted forms (U.S. Pat. Nos. 4,714,601; 4,879,103; 4,931,267; 4,965,059; 5,116,590), crown ethers (Zeolites, 10, p. 546 (1990)) alkaline polyoxides (U.S. Pat. No. 5,192,520), and others well known in the art.

The objective of the present invention is to develop improved zeolite preparation methods yielding high silica materials wherein a significant portion of the organic templates are derived from templates recycled from earlier preparations. The target zeolite group are the faujasite polymorphs, particularly those designated ECR-32/ECR-4 (see U.S. Pat. No. 4,714,601, U.S. Pat. No. 4,965,059, and U.S. Pat. No. 4,931,267), ECR-30 (U.S. Pat. No. 4,879,103) and ECR-35, (U.S. Pat. No. 5,116,590) and like materials. The principal objective of this invention is to significantly improve the process economics for making such materials, and improving the process effluent and waste properties, thus reducing pollution control costs.

SUMMARY OF THE INVENTION

The present invention is a process for preparing an aluminosilicate having a faujasite family structure and a composition, in terms of mole ratios of oxides, in the range:

$$0.2 \text{ to } 0.80 \text{ } T_2O{:}0.20 \text{ to } 0.8 \text{ } Na_2O{:}Al_2O_3{:}4 \text{ to } 15 \text{ } SiO_2{:}xH_2O$$

wherein T represents an organic "template" trapped in supercages of the zeolite and x represents O or an integer from 1 to 20 depending on the degree of hydrations. The process includes the steps of preparing a reaction mixture comprising an oxide of sodium, an organic template, water, a source of combined silica and alumina having Si/Al in the range 5 to 20 and sodium aluminosilicate nucleating seeds, the reaction mixture having a composition, in terms of mole ratios of oxides, within the following ranges:

| | |
|---|---|
| $(Na,T)_2O{:}Al_2O_3$ | 3 to 15 |
| $SiO_2{:}Al_2O_3$ | 10 to 40 |
| $H_2O{:}Al_2O_3$ | 120 to 500 | where T represents the cation of the organic ammonium template, the seeds present in an amount to yield 0.1 to 10 mole percent of the total final alumina content in said aluminosilicate; blending the reaction mixture sufficiently to substantially form a mixture; maintaining the reaction mixture at between about 80° C. and 160° C. under autogenous pressure for a sufficient period of time to form crystals of the aluminosilicate; and recovering the aluminosilicate crystals. It is understood that Ca, Zn, Fe, B, Ti, V, etc. may partly or wholley replace the Al in these formulations.

DESCRIPTION OF PREFERRED EMBODIMENT

The process developments of this invention both enhance the high silica faujasite family synthesis economics and are environmentally protective. We have discovered that we can use a pre-formed silica-alumina gel to make these zeolites and that such raw materials can also be used to make them in high purity with recycled mother liquors. The use of other raw materials with recycled ML results in impure products or complete replacement by ZSM-5. This invention allows the waste product from one batch to be used as a raw material in subsequent batches of the same material. The process improvements not only save on the high cost of conventional template recovery (the "template" cation is either recovered on ion exchange columns or by steam stripping of effluents), but also eliminates the disposal or recovery of the excess silica in the ML (by pH adjustment, settling and filtration, followed by disposal or incorporation into the subsequently used silica-alumina gel). The template contents of the filtrates are readily measured by solution $^{13}$C-NMR methods, facilitating rapid ML utilization in subsequent zeolite batches.

EXAMPLE 1

Preparation of Nucleant Seeds

A nucleant seed solution of stoichiometry, $$13.3\ Na_2O:Al_2O_3:17.5\ SiO_2:267\ H_2O,$$

was prepared by first preparing a sodium aluminate solution by dissolving 48.5 g. NaOH in 100 ml. distilled water. To this solution 11.5 g. of alumina trihydrate ($Al_2O_3 \cdot 3H_2O$; 156.01 g/mole; ALCOA C-31) was added and the solution was heated with stirring on a hot plate/magnetic stirrer until the alumina dissolved. The solution was cooled to room temperature. To a one liter blender was added 269.8 g of N brand sodium silicate solution (P.Q. Corp. 8.9% $Na_2O$; 26.7% $SiO_2$) and 100 g. of distillated water. With vigorous stirring the sodium aluminate solution was slowly poured in and then rinsed in with distilled water. Enough distilled water was then added to bring the total weight of the mixture to 500 g. The mixture was again homogenized and then stored in a closed plastic or Teflon container. It was allowed to age at room temperature for 14 to 60 days prior to using in the reaction; such seeds are described in co-pending U.S. Ser. No. 347,004, incorporated herein by reference.

EXAMPLE 2

Preparation of Standard ECR-32

A sodium aluminate solution was prepared by dissolving 59 g NaOH in 100 ml. distilled water. To this solution 75 g. of aluminum trihydrate ($Al_2O_3 \cdot 3H_2O$; 156.01 g/mole; ALCOA C-31) was added and the solution was heated with stirring on a hot plate/magnetic stirrer to a mild boil until the alumina dissolved. The solution was then cooled to room temperature and distilled water added to a final weight of 250 g.

A reactant gel was prepared having the stoichiometry:

$$4.8\ TPA_2O;\ 1.6\ Na_2O:Al_2O_3:24\ SiO_2:350\ H_2O:0.72\ Na_2SO_4$$

To a 3000 ml. plastic beaker were added, while mixing 337 g. of 40% colloidal silica (HS-40, dupont Ludox; 40 wt % $SiO_2$), 68.6 g. nucleant seeds (Example 1, aged for 57 days), 492.1 g. of aq. 40% TPAOH, 34.6 g. sodium aluminate solution as made above, 31.5 g. of 50% $Al_2(SO_4)_3 \cdot 17H_2O$ solution, and enough distilled water to bring the total weight of mixture to 1000 g. The whilte gel was transferred to a blender and thoroughly homogenized. The gel was then placed in 1000 ml. Teflon bottle and reacted in an air oven at 100° C. for 10 days. The product was filtered and the filtrate saved (this is the ML filtrate to be recycled to subsequent examples). The product was then washed with distilled water and dried in an air oven at 115° C. Powder X-ray diffration showed the product to be pure ECR-32 having a unit cell dimension of 24.506 Å Elemental analysis gave: 5.21% Al; 2.66% Na; 26.9% Si, which represents a Si/Al ratio of 4.96. After calcination at 620° C. in air to remove the template and then outgassing in an absorption apparatus at 400° C. to <$10^{-4}$ torr, a sample of this product absorbed 19.9% n-hexane at 50 torr pressure and 23° C.

EXAMPLE 3

Comparative example of ECR-32 using the mother liquor filtrate of Example 2 and silica gel reagent typical of the prior art, showing that unless the alumina is in a combined form with silica, ZSM-5 not ECR-32 is the dominant product.

A reactant slurry was prepared having the stoichiometry:

$$4.8\ TPA_2O:1.6\ Na_2O:Al_2O_3:24\ SiO2:400\ H_2O:1.30\ Na_2SO_4$$

by first preparing a sodium aluminate solution by dissolving 59 g. NaOH in 100 ml. distillated water. To this solution 75 g. of alumina trihydrate ($Al_2O_3 \cdot 3H_2O$; 156.01 g./mole; ALCOA C-31) was added and the solution was heated with stirring on a hot plate/magnetic stirrer until the alumina dissolved. The solution was cooled to room temperature and diluted to 250 g. with distilled water. To a 250 ml. plastic beaker were added 88.7 g. filtrate from a previous colloidal silica preparation of ECR-32, 7.91 g. nucleant seeds (13.33 $Na_2O:Al_2O_3$:17.5 $SiO_2$:267 $H_2O$, aged for 42 days), 11.8 g. of aq. 40% TPAOH, 17.3 g. of silica gel (10% $H_2O$), 2.82 g. of sodium aluminate solution, 6.52 g. of 50% $Al_2(SO_4)_3 \cdot 17H_2O$, and enough distilled water to bring the total weight of mixture to 135 g. The mixture was transferred to a blender and thoroughly homogenized. It was then placed in 125 ml. Teflon bottle and reacted in an air oven at 100° C. for 4 days. The product was filtered, washed with distilled water and dried in an air oven at 115° C. Powder X-ray diffraction showed the product to be ZSM-5 zeolite.

EXAMPLE 4

Comparative example of ECR-32 using ML filtrate, sodium aluminate and colloidal silica, yielding impure products.

A reactant slurry was prepared having the stoichiometry:

$$4.8\ TPA_2O:1.6\ Na_2O:Al_2O_3:24\ SiO_2:380\ H_2O$$

A 126.9 g. filtrate portion from a previous colloidal silica preparation of Example 2 ECR-32 batch was boiled down to a weight of 77.8 g. to reduce the water content to an acceptable level. To a 250 ml. plastic beaker were added 77.8 g of the concentrated filtrate solution, 8.12 g. nucleant seeds (13.33$Na_2O:Al_2O_3$:12.5 $SiO_2$:267 $H_2O$, aged for 21 days), 11.8 g. of aq. 40% TPAOH, 18.7 g. of colloidal silica (DuPont Ludox HS-40, 40% $SiO_2$) 2.94 g. of sodium aluminate solution as made above, 7.25 g. of 50% $Al_2(SO_4)_3 \cdot 17H_2O$, and enough distilled water to bring the total weight of mixture to 125 g. The mixture was transferred to a blender and thoroughly homogenized. It was then placed in 125 ml. Teflon bottle and reacted in an air oven at 100° C. for 20 days. The product was filtered, washed with distilled water and dried in an air oven at 115° C. Powder X-ray diffraction showed the product to be ECR-32 contaminated with zeolite P (gismondine).

EXAMPLE 5

Preparation of ECR-32 Using the ML Filtrate of Example 2

Example 2 was repeated and the ML filtrate isolated as described in Example 2. A reactant slurry was prepared having the stoichiometry:

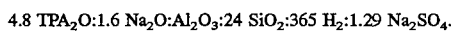

4.8 TPA$_2$O:1.6 Na$_2$O:Al$_2$O$_3$:24 SiO$_2$:365 H$_2$:1.29 Na$_2$SO$_4$.

To a 1000 ml. plastic beaker were added 363.9 g. filtrate of Example 2, 33.5 g. nucleant seeds (Example 1, aged for 57 days), 55.8 g. of aq. 40% TPAOH, 40.1 g of Lo-Alumina fluid cracking catalyst (Grace, 11.3% Al$_2$O$_3$; 78.8% SiO$_2$; 10% H$_2$O), 5.73. g. of 48% H$_2$SO$_4$, and enough distilled water to bring the total weight of mixture to 500 g. The mixture was transferred to a blender and thoroughly homogenized. It was then placed in 500 ml. Teflon bottle and reacted in an air oven at 100° C. for 10 days. The product was filtered and the filtrate saved. The product was then washed with distilled water and dried in an air oven at 115° C. Powder X-ray diffration showed the product to be pure ECR-32 having a unit cell dimension of 24.479 Å. Elemental analysis gave: 5.61% Al; 2.95% Na; 26.9% Si, which represents a Si/Al ratio of 4.61. After calcination at 620° C. in air to remove the template and then outgassing in an absorption apparatus at 400° C. to <10$^{-4}$ torr, a sample of this product absorbed 19.8% n-hexane at 51 torr pressure and 24° C.

EXAMPLE 6

Preparation of ECR-32 Using the ML Filtrate of Example 5

A reactant slurry was prepared having the stoichiometry:

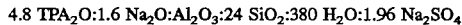

4.8 TPA$_2$O:1.6 Na$_2$O:Al$_2$O$_3$:24 SiO$_2$:380 H$_2$O:1.96 Na$_2$SO$_4$

To a 1000 ml. plastic beaker were added 327.5 g. filtrate from example 5, 1 g. nucleant seeds (Example 1, aged for 67 days), 50.2 g. of aq. 40% TPAOH, 36.1 g of Lo-Alumina fluid cracking catalyst (Grace, 11.3% Al$_2$O$_3$; 78.8% SiO$_2$; 10% H$_2$O), 5.2 g. of 48% H$_2$SO$_4$, and enough distilled water to bring the total weight of mixture to 450 g. The mixture was transferred to a blender and thoroughly homogenized. It was then placed in 500 mi. Teflon bottle and reacted in an air oven at 100° C. for 9 days. The product was filtered and the filtrate saved. The product was then washed with distilled water and dried in an air oven at 115° C. Powder X-ray diffration showed the product to be pure ECR-32 having a unit cell dimension of 24.504 Å. Elemental analysis gave: 6.00% Al; 3.20% Na; 27.4% Si, which represents a Si/Al ratio of 4.39. After calcination at 620° C. in air to remove the template and then outgassing in an absorption apparatus at 400° C. to <10$^{-4}$ torr, a sample of this product absorbed 19.8% n-hexane at 51 torr pressure and 23° C.

EXAMPLE 7

Preparation of ECR-32 Using the ML Filtrate of Example 6

A reactant slurry was prepared having the stoichiometry:

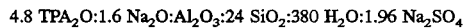

4.8 TPA$_2$O:1.6 Na$_2$O:Al$_2$O$_3$:24 SiO$_2$:380 H$_2$O:1.96 Na$_2$SO$_4$

To a 1000 ml. plastic beaker were added 325 g. filtrate from Example 6, 15.4 g. nucleant seeds (Example 1, aged for 23 days), 42.7 g. of aq. 40% TPAOH, 34.7 g. of Lo-Alumina fluid cracking catalyst (Grace, 11.3% Al$_2$O$_3$; 78.8% SiO$_2$; 10% H$_2$O), and enough distilled water to bring the total weight of mixture to 420 g. The mixture was transferred to a blender and thoroughly homogenized. It was then placed in 500 ml. Teflon bottle and reacted in an air oven at 100° C. for 15 days. The product was filtered and the filtrate saved. The product was then washed with distilled water and dried in an air oven at 115° C. Powder X-ray diffration showed the product to be pure ECR-32 having a unit cell dimension of 24.474 Å. Elemental analysis gave: 5.70% Al; 2.89% Na; 29.4% Si, which represents a Si/Al ratio of 4.96. After calcination at 620° C. in air to remove the template and then outgassing in an absorption apparatus at 400° C. to <10$^{-4}$ torr, a sample of this product absorbed 20.0% n-hexane at 50 torr pressure and 22° C.

EXAMPLE 8

Preparation of ECR-32 using a silica-alumina gel as the alumina source, demonstrating that silica-alumina gel is a viable raw material for virgin syntheses A reactant gel was prepared having the stoichiometry:

4.8 TPA$_2$O:1.6 Na$_2$O:Al$_2$O$_3$:24 SiO$_2$:275 H$_2$O

To a 1250 ml. plastic blender were added 101.6 g. of 40% colloidal silica (HS-40, dupont Ludox; 40 wt. % SiO$_2$), 48.2 g. nucleant seeds (13.33 Na$_2$O:Al$_2$O$_3$:17.5 SiO$_2$:267 H$_2$O, aged for 18 days), 288.3 g. of aq. 40% TPAOH, 47.1 g. of Lo-Alumina fluid cracking catalyst (Grace, 11.3% Al$_2$O$_3$; 78.8% SiO2; 10% H$_2$O), and enough distilled water to bring the total weight of mixture to 500 g. The mixture was then thoroughly homogenized and placed in a 500 mi. Teflon bottle and reacted in an air oven at 100° C. for 10 days. The product was filtered and the filtrate saved. The product was then washed with distilled water and dried in an air oven at 115° C. Powder X-ray diffraction showed the product to be pure ECR-32 having a unit cell dimension of 24.492 Å Elemental analysis gave: 6.01% Al; 3.18% Na; 28.6% Si, which presents a Si/Al ratio of 4.57. After calcination at 620° C. in air to remove the template and then outgassing in an absorption apparatus at 400° C. to <10$^{-4}$ torr, a sample of this product absorbed 20.2% n-hexane at 50 torr pressure and 24° C.

What is claimed is:

1. A process for preparing an aluminosilicate having a faujasite family structure and a composition, in terms of mole ratios of oxides, in the range:

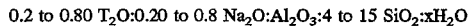

0.2 to 0.80 T$_2$O:0.20 to 0.8 Na$_2$O:Al$_2$O$_3$:4 to 15 SiO$_2$:xH$_2$O wherein T represents an organic template trapped in supercages of said zeolite and x represents 0 or an integer from 1 to 20, wherein said process comprises:

(a) preparing a reaction mixture comprising an oxide of sodium, an organic template, wherein a significant portion of the organic template is derived from templates recycled from earlier preparations, water, a source of combined silica and alumina having Si/Al in the range 5 to 20 and sodium aluminosilicate nucleating seeds, said reaction mixture having a composition, in terms of mole ratios of oxides, within the following ranges:

|  |  |
|---|---|
| (Na,T)$_2$O:Al$_2$O$_3$ | 3 to 15 |
| SiO$_2$:Al$_2$O$_3$ | 10 to 40 |
| H$_2$O:Al$_2$O$_3$ | 120 to 500 | where T represents the organic template, said seeds present in an amount to yield 0.1 to 10 mole percent of the total final alumina content in said aluminosilicate;

(b) blending the reaction mixture sufficiently to substantially form a mixture;

(c) maintaining the reaction mixture at between about 80° C. and 160° C. under autogenous pressure for sufficient period of time to form crystals of said aluminosilicate; and (d) recovering said aluminosilicate crystals.

2. The process of claim 1 wherein the reaction product is ECR-32.

3. The process of claim 1 wherein the reaction product is ECR-4.

4. The process of claim 1 wherein reaction product is ECR-30.

5. The process of claim 1 wherein said reaction product is ECR-35.

6. A process of claim 1 wherein the alumina source is a spray dried silica-alumina gel having an Si/Al ratio between 8 and 16.

7. A process of claim 1 wherein Al is partly or wholely replaced by Ga.

8. A process of claim 1 wherein Al is partly replaced by Zn or Fe or B or Ti or V.

* * * * *